United States Patent
Karlsson et al.

(10) Patent No.: US 9,819,277 B2
(45) Date of Patent: Nov. 14, 2017

(54) ISOLATED BUCK CONVERTER, SWITCHED MODE POWER SUPPLY, AND METHOD OF TRANSFERRING DIGITAL DATA FROM A PRIMARY SIDE TO AN ISOLATED SECONDARY SIDE OF AN ISOLATED BUCK CONVERTER

(71) Applicant: TELEFONAKTIEBOLAGET L M ERICSSON (PUBL), Stockholm (SE)

(72) Inventors: Magnus Karlsson, Oskarshamn (SE); Oscar Persson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,419

(22) PCT Filed: Jul. 9, 2015

(86) PCT No.: PCT/SE2015/050811
§ 371 (c)(1),
(2) Date: Apr. 19, 2016

(87) PCT Pub. No.: WO2017/007387
PCT Pub. Date: Jan. 12, 2017

(65) Prior Publication Data
US 2017/0170741 A1    Jun. 15, 2017

(51) Int. Cl.
*H02M 3/335*    (2006.01)

(52) U.S. Cl.
CPC ... *H02M 3/33569* (2013.01); *H02M 3/33507* (2013.01)

(58) Field of Classification Search
None
See application file for complete search history.

(56) References Cited

U.S. PATENT DOCUMENTS

| 2011/0026275 A1* | 2/2011 | Huang | H02M 3/33576 363/21.02 |
| 2011/0090724 A1* | 4/2011 | Appelberg | H02M 3/33592 363/89 |
| 2013/0148385 A1* | 6/2013 | Zhang | H02M 3/33592 363/21.12 |
| 2013/0155726 A1* | 6/2013 | Xu | H02M 3/33576 363/17 |

(Continued)

FOREIGN PATENT DOCUMENTS

WO    2015137852 A1    9/2015

*Primary Examiner* — Jeffrey Gblende

(57) ABSTRACT

An isolated buck converter for converting an analog input voltage to an analog output voltage is capable of transferring digital data from the primary side to the secondary side. The converter comprises, on a primary side, a primary winding and a non-isolated buck connected in series, and a pair of switches switchable between a forward phase and a fly-buck phase. A secondary winding, on a secondary side, is inductively coupled to the primary winding, and a first capacitive element is connected over the secondary winding. The output voltage is achieved as the voltage over the first capacitive element. Further, the converter comprises, at the secondary side, supplementary circuitry by aid of which digital data can be transferred from the primary side to the secondary side.

10 Claims, 4 Drawing Sheets

(56) References Cited

U.S. PATENT DOCUMENTS

| | | | |
|---|---|---|---|
| 2013/0169182 A1* | 7/2013 | Park | H02M 3/33507 315/219 |
| 2013/0343099 A1* | 12/2013 | Eom | H02M 3/33569 363/21.12 |
| 2014/0085936 A1* | 3/2014 | Jin | H02M 1/44 363/16 |
| 2015/0162837 A1* | 6/2015 | Duan | H02M 3/337 363/21.14 |

* cited by examiner

ISOLATED BUCK CONVERTER, SWITCHED MODE POWER SUPPLY, AND METHOD OF TRANSFERRING DIGITAL DATA FROM A PRIMARY SIDE TO AN ISOLATED SECONDARY SIDE OF AN ISOLATED BUCK CONVERTER

This application is a 371 of International Application No. PCT/SE2015/050811, filed Jul. 9, 2015, the disclosure of which is fully incorporated herein by reference.

TECHNICAL FIELD

The technical field relates to isolated buck converters, to switched mode power supplies comprising isolated buck converters, and to methods of transferring digital data from a primary side to an isolated secondary side of an isolated buck converter.

BACKGROUND

There are numerous of ways of designing a housekeeping supply for isolated switched mode power supplies (SMPS:es). The largest problem is to supply the isolated secondary side with reliable power. Fly-back solutions exist, but the high voltage isolation requirement of basic isolation and high isolation voltage cause huge problems when designing the device, see e.g. the publication US 2011/0090724 A1. In order to supply the primary side with regulated power the transformer requires typically three windings.

An alternative approach is to use an auxiliary winding in the main transformer, or tap off power from the main transformer. This requires that the main switches are switching. These cause problems, during pre-bias starts and during fault handling when the output must be turned off, while the housekeeping power at the secondary side is still necessary.

The standard solution for signaling over the isolation barrier is to use optocouplers or signal transformers. Both these components take up valuable board space and have their drawbacks in terms of manufacturability, reliability, and aging.

SUMMARY

It is an aim to provide an isolated buck converter for a switched mode power supply, wherein the problems of the prior art approaches are alleviated or at least mitigated.

A first aspect refers to an isolated buck converter for converting an analog input voltage to an analog output voltage and which comprises capabilities of transferring digital data from the primary side to the isolated secondary side.

The converter comprises, on the primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and, on the secondary side, a secondary winding inductively coupled to the primary winding, and a first capacitive element connected over the secondary winding and a first rectifying element connected to the secondary winding to prevent current from being flown through there during the forward phase, wherein the output voltage is achieved as the voltage over the first capacitive element.

Further, the converter comprises, at the secondary side, supplementary circuitry by aid of which digital data can be transferred from the primary side to the secondary side. The supplementary circuitry comprises a second capacitive element and a second rectifying element connected in series, wherein the supplementary circuitry is connected over the secondary winding such that the second rectifying element prevents current from being flown through the supplementary circuitry during the fly-buck phase, wherein a voltage between the first and second capacitive elements, carries digital data from the analog input voltage.

By such design of an isolated converter, accurate and reliable digital data entered at the primary side can be tapped off at the isolated secondary side of the converter.

The converter may particularly be provided as an auxiliary converter or housekeeping supply of a switched mode power supply, to power a control arrangement configured to control the main converter thereof.

The digital data entered at the primary side can be tapped off at the isolated secondary side of the converter by means of a comparator or a sample and hold circuitry.

In one embodiment, the supplementary circuitry may comprise a resistive element connected in series with the second capacitive element and the second rectifying element.

Hereby, the current spikes during charging of the second capacitive element are reduced and the produced voltage over the second capacitive element will be less noisy.

In another embodiment, the supplementary circuitry may comprise a voltage divider including two serially connected resistive elements connected in parallel over the first and second capacitive elements, and a further capacitive element and a voltage reference connected in parallel over one of the resistive elements of the voltage divider, wherein a voltage over the voltage reference is usable as a hybrid regulated ratio reference for the main converter.

In an alternative embodiment, the supplementary circuitry may comprise a voltage divider including two serially connected resistive elements connected in parallel over the first and second capacitive elements, and a further capacitive element connected in parallel over one of the resistive elements of the voltage divider, wherein a voltage over the further capacitive element is usable as a regulated ratio reference for the main converter.

A second aspect refers to a switched mode power supply comprising a main converter configured to convert the input voltage to an output voltage, a control arrangement for controlling the operation of the main converter, and the converter of the first aspect for powering the control arrangement. The isolated fly-buck converter is advantageously connected to pass to the control arrangement, the transferred digital data from the primary side, and the control arrangement is advantageously configured to control the operation of the main converter in response this digital data.

For instance, the above disclosed hybrid regulated ratio reference, regulated ratio reference, or sample and hold voltage indicative of the input voltage may be used as input by the control arrangement in the control of the main converter of the switched mode power supply.

The voltage indicative of the input voltage may also be used by the control arrangement to handle input voltage transients (voltage mode feed-forward). To this end, the voltage indicative of the input voltage has to be monitored with a high dynamic bandwidth.

The main converter may be a DC-DC converter, e.g. a DC-DC voltage down-converter e.g. configured to operate with input and output voltages in the range of 10-100 V. While the design of the isolated fly-back converter of the first aspect is typically used with a converter ratio of 1:1, a main voltage down-converter would typically require lower voltages for FET transistors of the drive. Therefore, a suitable converter ratio for the isolated fly-back converter may be 1:0,75.

A third aspect refers to a base station comprising the isolated fly-buck converter of the first aspect or the switched mode power supply of the second aspect.

A fourth aspect refers to a method of transferring digital data from a primary side to a secondary side of an isolated buck converter comprising (i) on a primary side, a primary winding and a non-isolated buck connected in series, and a pair of switches, wherein the switches are switchable between a forward phase, in which the primary winding and the non-isolated buck are connected to an input voltage, and a fly-buck phase, in which the primary winding and the non-isolated buck are disconnected from the input voltage and are connected to one another in a closed circuit; and (ii) on a secondary side, a secondary winding coupled to the primary winding, and a first capacitive element connected over the secondary winding and a first rectifying element connected to the secondary winding to prevent current from being flown through the secondary winding during the forward phase.

According to the method supplementary circuitry is provided at the secondary side of the isolated buck converter, wherein the supplementary circuitry comprises a second capacitive element and a second rectifying element connected in series, wherein the supplementary circuitry is connected over the secondary winding such that the second rectifying element prevents current from being flown through the supplementary circuitry during the fly-buck phase.

A voltage, between the first and second capacitive elements, which carries digital data from the analog input voltage, is analyzed, through which the digital data can be retrieved. The voltage may be analyzed by a comparator or by a sample and hold circuitry.

Further details and alternatives can be obtained by minor modifications of the details and alternatives disclosed above with respect to the first to third aspects.

Further characteristics and advantages will be evident from the detailed description of embodiments given hereinafter, and the accompanying FIGS. 1-6, which are given by way of illustration only.

DETAILED DESCRIPTION

Figure 1:
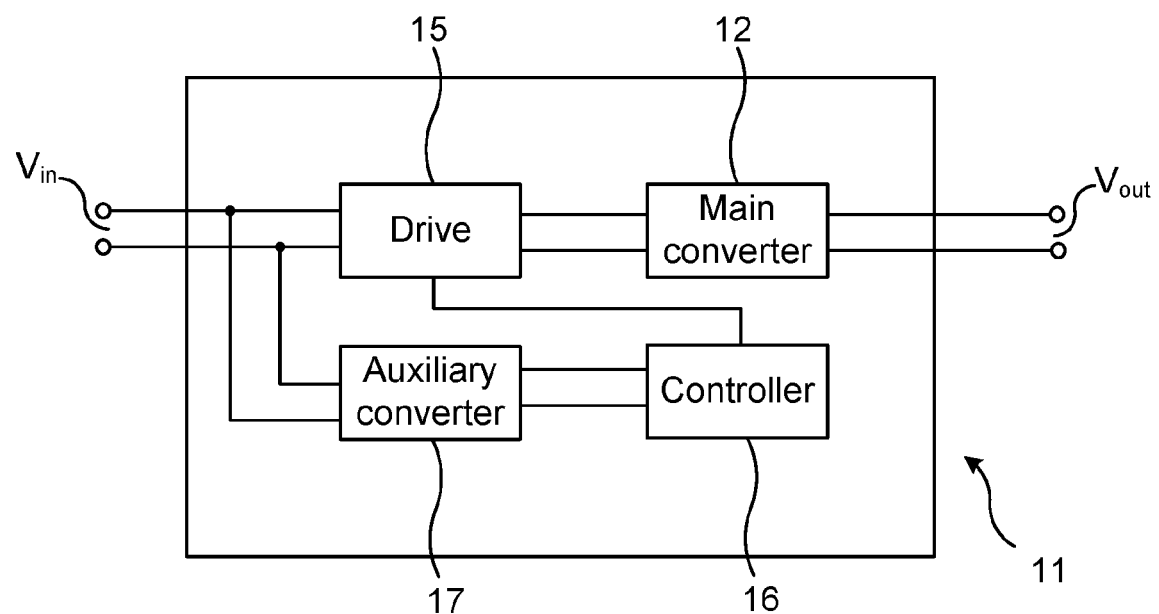
FIG. 1 illustrates, schematically, in a block diagram an embodiment of a switched mode power supply.

FIG. 1 illustrates, schematically, an embodiment of a switched mode power supply (SMPS) 11 comprising a main converter 12 for converting an input voltage $V_{in}$ to an output voltage $V_{out}$, a drive 15 for driving the converter 12, a controller 16 for controlling the drive 15 and thus the operation of the main converter 12, and a housekeeping or auxiliary converter 17 for down converting the input voltage $V_{in}$ to a voltage suitable for the controller 16, such that the controller 16 can be powered by the input voltage $V_{in}$.

The main converter 12 is an isolated DC-DC converter, typically down-converting the input voltage $V_{in}$ to a suitable output power $V_{out}$. The main converter 12 may typically operate with input $V_{in}$ and output $V_{out}$ voltages in the range of 10-100 V.

The auxiliary converter 17 is an isolated fly-buck converter with a non-insulated buck and embodiments thereof will be further detailed below with reference to FIGS. 3-5.

Figure 2:
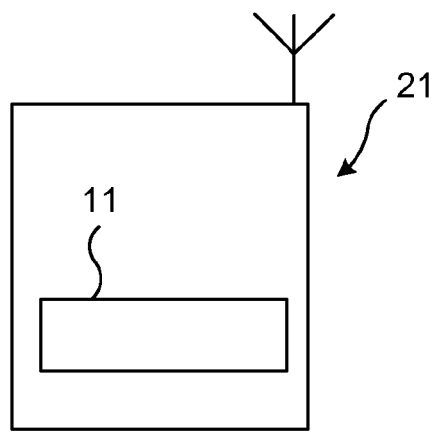
FIG. 2 illustrates, schematically, an embodiment of a base station comprising one or more of the switched mode power supply of FIG. 1.

FIG. 2 illustrates, schematically, an embodiment of a base station 21 comprising one or more of the SMPS 11 of FIG. 1.

Figure 3:
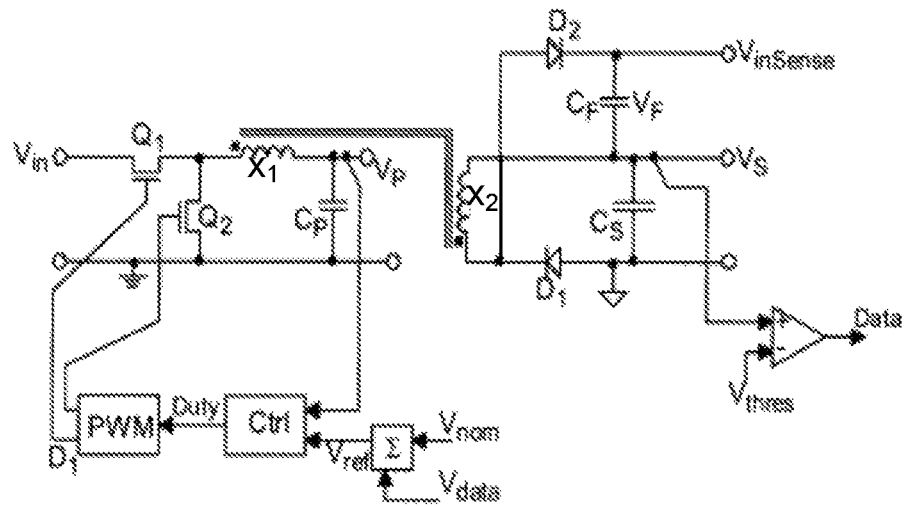
FIG. 3 illustrates, schematically, in a circuit diagram, an embodiment of a converter, which can be used in the switched mode power supply of FIG. 1.
Figure 4A:
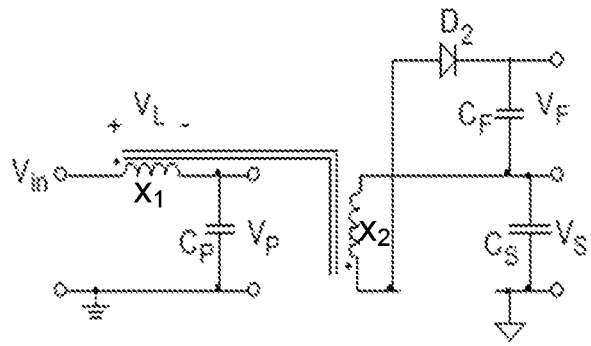
FIGS. 4a-b are simplified and schematic circuit diagrams of the converter of FIG. 3 in forward and fly-buck modes, respectively.

FIG. 3 illustrates, schematically, in a circuit diagram, an embodiment of an isolated fly-buck converter, which can be used in the SMPS of FIG. 1.

The fly-buck converter is configured to convert the input voltage $V_{in}$ to an output voltage $V_S$ and comprises, at the primary side, a primary winding $X_1$, a non-isolated buck $C_P$, and a pair of switches $Q_1$, $Q_2$, and, at the secondary, a winding $X_2$, a first capacitive element $C_S$, and a first rectifying element $D_1$.

The non-isolated buck $C_P$, e.g. implemented as a capacitor, is connected in series with the primary winding $X_1$ and the pair of switches $Q_1$, $Q_2$ are operable to switch between a forward phase (switch Q1 is conducting and switch Q2 is off), in which the primary winding $X_1$ and the non-isolated buck $C_P$ are connected to the input voltage $V_{in}$, and a fly-buck phase (switch Q1 is off and switch Q2 is conducting), in which the primary winding $X_1$ and the non-isolated buck $C_P$ are disconnected from the input voltage $V_{in}$, but are connected to one another in a closed circuit. The switching of the switches $Q_1$, $Q_2$ may be controlled by a simple integrated circuit (not illustrated).

The secondary winding $X_2$ is electromagnetically coupled to the primary winding $X_1$, and the first capacitive element $C_S$, e.g. implemented as a capacitor, is connected over the secondary winding $X_2$ and the first rectifying element $D_1$, e.g. implemented as a diode, is connected to the secondary winding $X_2$ to prevent current from flowing through the secondary winding $X_2$ during the forward phase. The output voltage $V_S$ is achieved as the voltage over the first capacitive element $C_S$.

In order to be able to transfer digital data from the primary side to the isolated secondary side, supplementary circuitry is provided at the secondary side. The supplementary circuitry comprises a second capacitive element $C_F$, e.g. implemented as a capacitor, and a second rectifying element $D_2$, e.g. implemented as a diode, connected in series, wherein the supplementary circuitry is connected over the secondary winding $X_2$ such that the second rectifying element $D_2$ prevents current from being flown through the supplementary circuitry during the fly-buck phase, wherein the sum of the voltage $V_F$ over the second capacitive element and the output voltage $V_S$ is a sensed measure $V_{inSense}$ at the isolated secondary side indicative of the input voltage $V_{in}$ at the primary side. The measuring circuitry may comprise a resistive element (not illustrated) connected in series with the second capacitive element $C_F$ and the second rectifying element $D_2$, the purpose of which being to reduce the current spikes during charging of the second capacitive element $C_F$, thereby producing a less noisy voltage over second capacitive element $C_F$.

The following calculations assume steady state switching with a duty cycle D, small inductor ripple current, and small capacitor voltage ripple. During the forward phase when Q1 is conducting and Q2 is off the schematic can be simplified to the schematic shown in FIG. 4a, since rectifying element D1 becomes non-conducting. The resistor is removed for simplicity during the analysis.

The voltage over the inductor can be stated directly at the primary side as $$V_L = V_{in} - V_P \qquad \text{Equation 1}$$

Or, using the reflected $V_F$ voltage at the primary side $$V_L = \frac{V_F + V_D}{n} \qquad \text{Equation 2}$$

where $V_D$ is the voltage drop over the rectifying element/diode $D_2$ in the forward direction.

Figure 4B:
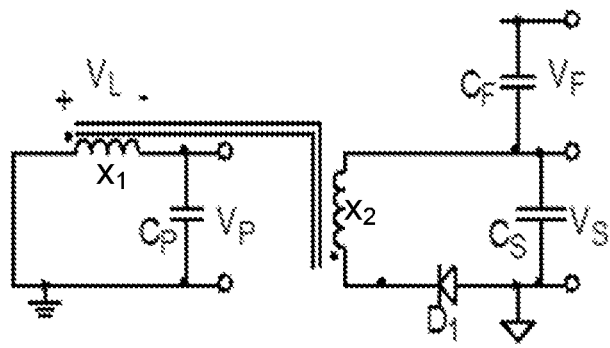

During the fly-back phase, a schematic of which is shown in FIG. 4b, the calculations can be simplified to the below:

The voltage over the inductor can be stated directly at the primary side as $$V_L = -V_P \qquad \text{Equation 3}$$

Or, using the reflected $V_S$ voltage at the primary side $$V_L = -\frac{V_S + V_D}{n} \qquad \text{Equation 4}$$

where $V_D$ is the voltage drop over the rectifying element/diode $D_1$ in the forward direction.

The voltage balance equations are as follows.

For the non-isolated buck, Eq. 1 and 3 can be rewritten as $$D(V_{in} - V_P) + D'(-V_P) = 0 \qquad \text{Equation 5}$$

where the forward phase duration is equal to the duty cycle D, and the fly-back duration is the $(1-D)=D'$. Solving Eq. 5 for $V_P$ yields $$V_P = DV_{in} \qquad \text{Equation 6}$$

For the isolated fly-buck, the voltage balance using Eq. 1 and 4 becomes $$D(V_{in} - V_P) + D'\left(-\frac{V_S + V_D}{n}\right) = 0 \qquad \text{Equation 7}$$

Collecting terms on each sides yields $$DV_{in} = DV_P + D'\frac{V_S + V_D}{n},$$

and using Eq. 6 yields $$V_P = DV_P + D'\frac{V_S + V_D}{n}.$$

collecting $V_P$ on the left side and using $(1-D)=D'$ yield $$D'V_P = D'\frac{V_S + V_D}{n}.$$

Dividing with D' on both sides and solving for $V_S$ yield $$V_S = nV_P - V_D \qquad \text{Equation 8}$$

For the isolated forward-buck, the voltage balance using Eqs. 2 and 3 becomes $$D\frac{V_F + V_D}{n} + D'(-V_P) = 0 \qquad \text{Equation 9}$$

Solving Eq. 1 for $D'(-V_P)$ and replacing in Eq. 8 yield $$D\frac{V_F + V_D}{n} - D(V_{in} - V_P) = 0.$$

solving for $V_F$ yields $$V_F = n(V_{in} - V_P) - V_D \qquad \text{Equation 10}$$

The input sense voltage is the sum of voltages $V_S$ and $V_F$. Eqs. 9, and 10 yield $$V_{inSense} = V_S + V_F = nV_P - V_D + n(V_{in} - V_P) - V_D, \text{ and collecting terms yields}$$

$$V_{inSense} = nV_{in} - 2V_D \qquad \text{Equation 11}$$

Hence, the input voltage sense voltage is linear with $V_{in}$ and offset by two forward voltages for the rectifying elements, e.g. two diode forward voltages. Since the input voltage times the ratio is $nV_{in} \gg 2V_D$, Eq. 10 can be simplified to $$V_{inSense} \approx nV_{in} \qquad \text{Equation 12}$$

The diode forward voltage drops can be reduced using Schottky diodes or even eliminated by using synchronous rectification.

Figure 5A:
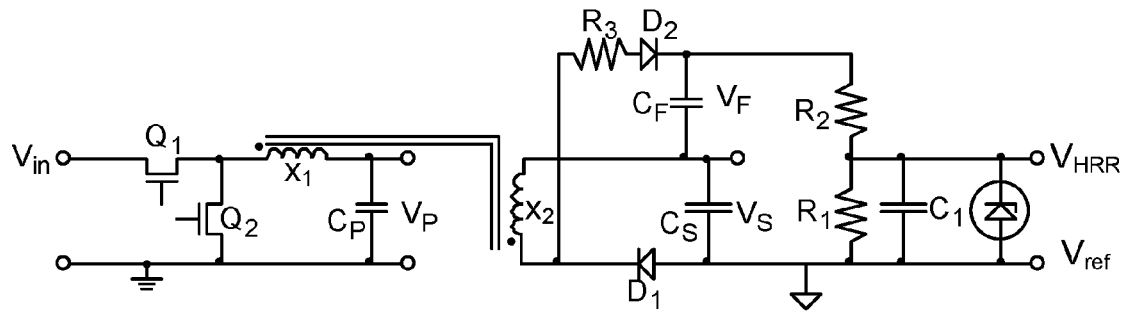
FIGS. 5a-c illustrate each, schematically, in a circuit diagram, a respective alternative embodiment of a converter, which can be used in the switched mode power supply of FIG. 1.
Figure 5B:
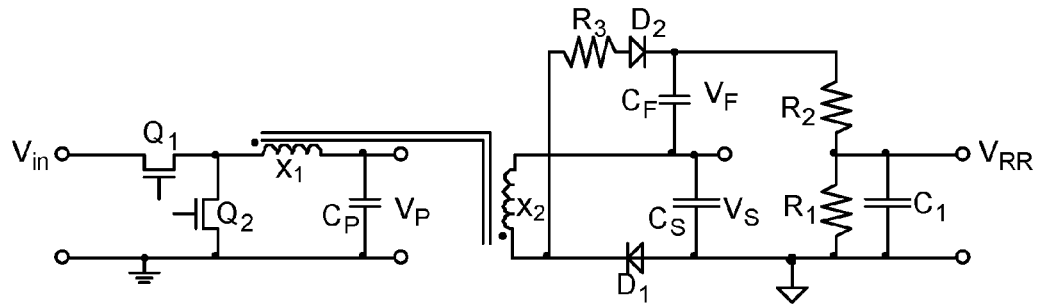
Figure 5C:
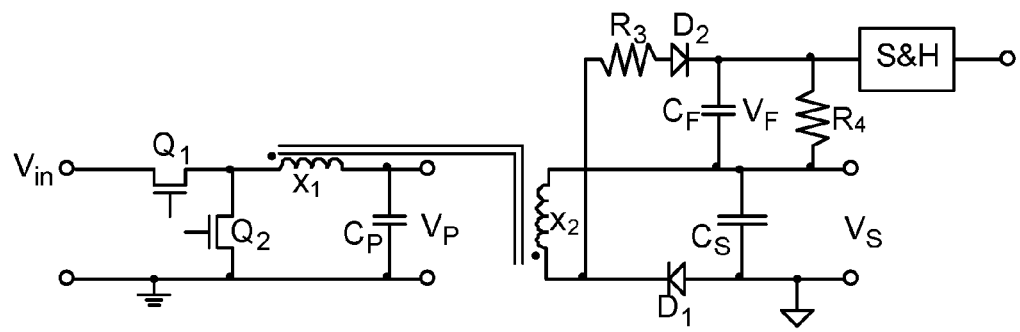

FIGS. 5a-c illustrate each, schematically, in a circuit diagram, a respective alternative embodiment of a converter, which can be used in the SMPS of FIG. 1.

FIG. 5a illustrates, schematically, in a circuit diagram, an embodiment of an isolated fly-buck converter, which can be used for hybrid regulated ratio control in the SMPS of FIG. 1.

The isolated fly-buck converter comprises, at the secondary side, a voltage divider including two serially connected resistive elements $R_1$, $R_2$ connected in parallel over the first and second capacitive elements $C_S$, $C_F$ to divide the sensed voltage $V_{sense}$. A fourth capacitive element $C_1$, e.g. implemented as a capacitor, adding a time constant and a voltage reference $V_{ref}$ are connected in parallel over one of the resistive elements $R_1$ of the voltage divider, wherein a voltage $V_{HRR}$ over the voltage reference $V_{ref}$ is usable as a hybrid regulated ratio reference in hybrid regulated ratio control of the main converter 12.

In FIG. 5a, the voltage $V_{sense} \approx nV_{in}$ is divided using a resistive divider $R_1/R_2$. Adding a time constant implemented using the capacitor $C_1$ and a saturated reference voltage using the high precision voltage reference $V_{ref}$, yielding the reference voltage for hybrid regulated ratio as $$V_{HRR} = \min\left\{ \frac{R_1}{R_1+R_2} \cdot \frac{1}{1+sC_1\frac{R_1R_2}{R_1+R_2}} nV_{in}, V_{ref} \right\},$$

where the regulated ratio input voltage part has the gain of $$G_{RR} = \frac{R_1}{R_1+R_2} \cdot n$$

and wherein the time constant is $$\tau_{RR} = C_1 \frac{R_1R_2}{R_1+R_2}.$$

FIG. 5b illustrates, schematically, in a circuit diagram, an embodiment of an isolated fly-buck converter, which can be used for regulated ratio control in the SMPS of FIG. 1.

The isolated fly-buck converter is identical with the isolated fly-buck converter of FIG. 5a except for that it lacks the voltage reference $V_{ref}$. A voltage $V_{RR}$ over the fourth capacitive element $C_1$ is usable as a regulated ratio reference in regulated ratio control of the main converter 12.

FIG. 5c illustrates, schematically, in a circuit diagram, an embodiment of an isolated fly-buck converter, which can be used for control in the SMPS of FIG. 1.

The isolated fly-buck converter comprises a resistive element $R_4$ connected in parallel over the second capacitive element $C_F$, via which the second capacitive element $C_F$ can be discharged, and a sample and hold circuit S&H configured to sample and hold the voltage indicative of the input voltage.

Below, a detailed description of an embodiment for transferring digital data from the primary side to the isolated secondary side of an isolated buck converter or housekeeping supply for an isolated SMPS will be described with reference to FIG. 3.

The housekeeping supply is configured to supply power for the circuits used in an isolated SMPS. The housekeeping supply, supplies both the primary side output voltage $V_P$, and at the secondary side of the SMPS with the output voltage $V_S$.

In a prior art coupled fly-buck supply with a control loop, measuring the primary side $V_P$ voltage and comparing it with the reference error signal $V_{ref}$-$V_P$, is used in the controller, which may be of any suitable controller type, e.g. proportional-integral-derivative (PID) controller. The controller's output is the duty cycle, which is transformed to two complementary pulse width modulated pulse trains, which control the two switches $Q_1$ and $Q_2$ of the housekeeping supply of FIG. 3

In isolated SMPS, information or signals must be sent over the isolation barrier of the buck converter. For example, the input voltage may be transferred as an analog signal to the output $V_{inSense}$. But it is also interesting to send digital data/information from the primary side to the secondary side of the SMPS, e.g. reset signals which reset the reference or turn off secondary side switches (e.g. MOSFET's) in case of a fault.

A simple way to send this information is to change the voltage level for $V_S$. A solution is illustrated in FIG. 3, wherein the reference signal for the voltage control loop is the summation of $V_{nom}$, which is the normal voltage reference and $V_{data}$ is the information signal. Hence, the information is sent over the isolation barrier as a different voltage levels for the $V_S$. The digital data is extracted at the secondary side by some comparator which uses a $V_{thres}$ as a threshold to determine if a data bit is equal to "1" or "0". The voltage $V_{thres}$ can be set halfway between the two different $V_S$ levels used.

The $V_{inSense}$ voltage is not modulated by the $V_{data}$ signal, but it may still function as an analog measurement of the $V_{in}$ and hereby the input voltage $V_{in}$ can be retrieved at the secondary side as disclosed in a previous patent application by Applicant.

In the simplest case, the $V_{data}$ signal is varying between two levels 0 V and another suitable voltage level, the resulting voltage level $V_S$ must not be too high so it harms the system(s), to which it should provide power, or too low such that the system(s) powered by the voltage Vs will stop operating. Usually there is voltage range that can be utilized for the signaling, so enough voltage difference can be obtained so the data can be retrieved safely in all respects.

The information bandwidth is limited by slew rate that the $V_S$ voltage can change and be detectable safely. Within the control loop bandwidth of typically some 10 kHz, a data rate of several kbit/s is feasible.

Variants of the embodiment include:

Using several different voltage levels, e.g., 6, 7, 8, 9 V for a nominal voltage supply of $V_S$=5 V can be utilized for sending two bits at the time. And when the voltage $V_S$ is equal to 5 V no communication is performed. This also makes the coding and decoding of the data a little more complicated, but is still standard and well known to a person skilled in this art.

The digital data transfer can be used without the $V_{inSense}$ circuitry.

The digital data transfer can be used for an isolated SMPS housekeeping supply, which lacks the primary voltage $V_P$, such as e.g. for an isolated buck converter.

Figure 6:
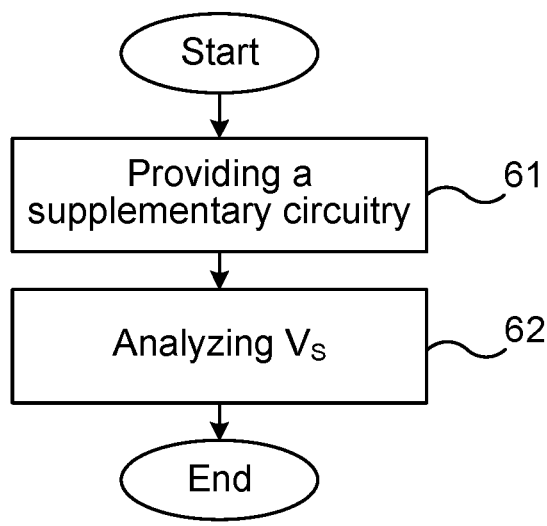
FIG. 6 is a schematic flow scheme of an embodiment of transferring digital data from a primary side to a secondary side of an isolated converter.

FIG. 6 is a schematic flow scheme of an embodiment of transferring digital data from a primary side to a secondary side of an isolated buck converter.

The isolated buck converter comprises (i) on a primary side, a primary winding and a non-isolated buck connected in series, and a pair of switches, wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and (ii) on a secondary side, a secondary winding coupled to the primary winding, and a first capacitive element connected over the secondary winding and a first rectifying element connected to the secondary winding to prevent current from being flown through the secondary winding during the forward phase, wherein the output voltage is achieved as the voltage over the first capacitive element.

According to the method, supplementary circuitry is, in a step 61, provided at the secondary side, wherein the supplementary circuitry comprises a second capacitive element $C_F$ and a second rectifying element $D_2$ connected in series, wherein the supplementary circuitry is connected over the secondary winding such that the second rectifying element prevents current from being flown through the supplementary circuitry during the fly-buck phase.

A voltage $V_S$ between the first and second capacitive elements, which carries digital data from the analog input voltage $V_{in}$, is, in a step 62, analyzed.

The digital data from the analog input voltage $V_{in}$ may analyzed by means of a comparator or a sample and hold circuit.

The digital data may be input to a control arrangement configured to control the operation of the isolated buck converter and/or of a main converter of a switched mode power supply in response thereto, e.g. using any voltage forward feed, regulated ratio, or hybrid regulated ratio control scheme.

It shall be appreciated by a person skilled in the art that the embodiments disclosed herein are merely example embodiments, and that any details and measures are purely given as examples only.

The invention claimed is:

1. An isolated buck converter for converting an analog input voltage to an analog output voltage and comprising capabilities of transferring digital data from the primary side to the secondary side, the isolated buck converter comprising:
    on a primary side:
        a primary winding and a non-isolated buck connected in series;
        a pair of switches;
            wherein the switches are switchable between a forward phase, in which the primary winding and the non-isolated buck are connected to the input voltage, and a fly-buck phase, in which the primary winding and the non-isolated buck are disconnected from the input voltage and are connected to one another in a closed circuit; and,
        means for imposing an information signal corresponding to said digital data on the voltage across said primary winding for extraction on the secondary side of the converter;
    on a secondary side:
        a secondary winding inductively coupled to the primary winding;
        a first capacitive element connected over the secondary winding and a first rectifying element connected to the secondary winding to prevent current from flowing through the secondary winding during the forward phase, wherein the output voltage is achieved as the voltage over the first capacitive element; and,
        supplementary circuitry by which said digital data can be extracted from the output voltage, wherein the supplementary circuitry comprises a second capacitive element and a second rectifying element connected in series, wherein the supplementary circuitry is connected over the secondary winding such that the second rectifying element prevents current from flowing through the supplementary circuitry during the fly-buck phase, wherein a voltage between the first and second capacitive elements carries said digital data from the analog input voltage, and wherein the supplementary circuitry further comprises a comparator to determine the digital data, said comparator having a first input coupled to said voltage between said first and second capacitive elements and a second input coupled to a threshold voltage.

2. The converter of claim 1, wherein said supplementary circuitry comprises a sample and hold circuitry.

3. The converter of claim 1, wherein said voltage between the first and second capacitive elements is also a measure of the analog input voltage.

4. The converter of claim 1, wherein the supplementary circuitry comprises a voltage divider including two serially connected resistive elements connected in parallel over the first and second capacitive elements, and a further capacitive element and a voltage reference connected in parallel over one of the resistive elements of the voltage divider, wherein a voltage over the voltage reference is usable as a regulated ratio reference or a hybrid regulated ratio reference for the main converter.

5. The converter of claim 1, wherein said supplementary circuitry comprises a resistive element connected in series with the second capacitive element and the second rectifying element.

6. A switched mode power supply (SMPS) comprising the isolated buck converter of claim 1, and further comprising:
    a main converter configured to convert the input voltage to an output voltage,
    a control arrangement for controlling the operation of the main converter,
    wherein said control arrangement is powered by the isolated buck converter.

7. The switched mode power supply of claim 6, wherein the isolated buck converter is connected to pass the digital data to the control arrangement, and the control arrangement is configured to control the operation of the main converter in response thereto.

8. The switched mode power supply of claim 7, wherein the main converter is a regulated ratio or hybrid regulated ratio controlled converter.

9. The switched mode power supply of claim 6, wherein the main converter is a DC-DC converter.

10. The switched mode power supply of claim 6, wherein the main converter is configured to operate with input and output voltages in the range of 10-100 V.

* * * * *